United States Patent
Grover et al.

(10) Patent No.: US 7,852,750 B2
(45) Date of Patent: Dec. 14, 2010

(54) SELF-FAULT ISOLATION IN TRANSPARENT P-CYCLE NETWORKS

(76) Inventors: Wayne D. Grover, 8944-116 Street, Edmonton, Alberta (CA) T6G 1P8; Aden Grue, 9107-116 Street, 7th Floor, Edmonton, Alberta (CA) T2G 2V4

( * ) Notice: Subject to any disclaimer, the term of this patent is extended or adjusted under 35 U.S.C. 154(b) by 71 days.

(21) Appl. No.: 12/204,564

(22) Filed: Sep. 4, 2008

(65) Prior Publication Data

US 2009/0161536 A1 Jun. 25, 2009

Related U.S. Application Data

(60) Provisional application No. 60/969,784, filed on Sep. 4, 2007.

(51) Int. Cl.
*H04L 12/26* (2006.01)
(52) U.S. Cl. ........................ 370/217; 370/221; 370/228; 370/229; 709/220; 714/2; 714/25
(58) Field of Classification Search .................. None
See application file for complete search history.

(56) References Cited

U.S. PATENT DOCUMENTS

| | | | |
|---|---|---|---|
| 6,404,734 B1 | 6/2002 | Stamatelakis | |
| 6,421,349 B1 | 7/2002 | Grover | |
| 6,914,880 B1 | 7/2005 | Grover | |
| 7,230,916 B2 | 6/2007 | Stamatelakis | |
| 2003/0229807 A1* | 12/2003 | Qiao et al. | 713/200 |
| 2004/0109407 A1 | 6/2004 | Grover | |
| 2004/0133663 A1 | 7/2004 | Grover | |
| 2005/0041575 A1* | 2/2005 | Kam et al. | 370/216 |
| 2006/0164976 A1* | 7/2006 | Grover et al. | 370/228 |
| 2007/0153674 A1* | 7/2007 | Alicherry et al. | 370/216 |

OTHER PUBLICATIONS

Zeng, Hongqing: "Fault Detection and Path Performance Monitoring in Meshed All-Optical Networks";IEEE Communications Society Globecom 2004, p. 2014-2018.
Zeng, Hongqing et al.: A Novel Fault Detection and Localization Scheme For Mesh All-Optical Networks Based on Monitoring-Cycles; Springer Science and Business Media, Inc.; 20.

* cited by examiner

*Primary Examiner*—Chi H. Pham
*Assistant Examiner*—Shick Hom
(74) *Attorney, Agent, or Firm*—Anthony R. Lambert

(57) ABSTRACT

Span protection has advantages in speed, locality of action and simplicity but requires that the failed span be located in real time. Recent work proposed rapid fault-localization via monitoring cycles (m-cycles). Span-protecting structures (such as p-cycles) operate and are designed separately from the monitoring cycles in this architecture. We have invented a method of designing survivable networks wherein a span protecting p-cycle network inherently includes the properties of a set of fault localizing m-cycles at zero or minimal additional network design cost. Results show that this can be achieved with the same localization effectiveness as separately designed m-cycle solutions, at little or no extra cost.

4 Claims, 3 Drawing Sheets

SELF-FAULT ISOLATION IN TRANSPARENT P-CYCLE NETWORKS

CROSS-REFERENCE TO RELATED APPLICATIONS

This application claims the benefit under 35 USC 119(e) of provisional application No. 60/969,784 filed Sep. 4, 2007, the content of which is hereby incorporated by reference.

TECHNICAL FIELD

Operation of telecommunication networks.

BACKGROUND

A challenge of survivable networking with optically transparent switching is that failure of a fiber span is not easily and quickly localized to the span at fault. In an "opaque" network, every optical line signal is electronically processed for switching and failures are inherently identified within their span of origin. But in an optically transparent network, loss-of-light will propagate along the length of the affected path. To achieve low cost, optically transparent switching nodes typically do not have fast-acting abilities to sense and isolate such failures. Methods are available following the failure to sectionalize the fault, but they are generally slower than required for activation of a protection switching response. However, a promising recent idea for fault localization takes a distributed approach in the work of Zeng, Huang and Vukovich [1] [2] with the elegant idea of an m-cycle cover of the graph.

The idea behind m-cycles is that if a network graph has a cycle cover in which the set of cycles covering each span differs by at least one cycle, then when a span fails, the span can be uniquely identified by the combination of covering cycles which display an alarm state. This assumes one signal monitor per cycle, which can be placed at any node on the cycle. This central idea was studied in the Ph.D. thesis by Zeng [2]. As so far considered, the idea is to use the fault localization as input to a separate protection or restoration scheme. The m-cycle scheme itself is agnostic about the survivability mechanism employed and could be used as the activating input for any span-protection scheme. In [2] the main focus is to find a wavelength-based cycle cover that maximizes the degree of fault localization using the minimum total length of cycles and/or number of cycle monitors. A branch and bound algorithm was developed to produce near-optimal solutions for the min-cost m-cycle cover problem.

p-Cycles predate m-cycles but at least structurally can be observed to be also cycles of pre-connected spare channels. Although from that point on m-cycles and p-cycles differ completely in their purpose, operation, and design as so far considered in the literature. p-Cycles operate for traffic protection, assuming the failed span is known. When one of the spans on a p-cycle fails, the cycle loops back around the body of the cycle similar to a BLSR ring. For any such "on cycle" failure there is one protection path available per unit of spare capacity in the p-cycle. But when a failure span "straddles" the cycle, two protection paths are available. p-Cycles are now a well established approach to fast and efficient survivable networking. See references such as [3] and [4]. In this document we determine that p-cycles may also serve as m-cycles, thus a group of span-protecting p-cycles as a set may also serve as an m-cycle cover of the graph for fault localization.

SUMMARY

It is not initially obvious that p-cycle network design could simultaneously include m-cycle properties without significant added cost. m-Cycles must constitute a cycle-cover, in which only the on-cycle spans of the m-cycles are important, while p-cycles are most efficient when they "stand off" from the working span capacities they protect—i.e. straddling span relationships are the most preferred from an efficiency standpoint. It is therefore of interest to see how these two contrasting tendencies might be reconciled under a single design model that guarantees full span protection and failure localization while minimizing total cost. If successful, the significance is that a new class of self-failure isolating survivable networks is identified, which may be advantageous in optically transparent networks.

Accordingly, there is provided a telecommunications network comprising plural nodes connected by plural spans and arranged to form a mesh network, the mesh network having a set of protected spans, and a set of pre-configured cycles. Each pre-configured cycle includes plural protected spans and plural nodes of the mesh network, the plural nodes of each pre-configured cycle being configured to transfer network traffic from each protected span to the pre-configured cycle in the event of a failure, and at least one of the plural nodes being configured to transmit a signal in the event of a failure of one of the protected spans of the pre-configured cycle. Each protected span is protected by a unique subset of pre-configured cycles, such that each subset of pre-configured cycles identifies at most a subset of protected spans.

In another aspect, each subset of pre-configured cycles identifies one span of the network. Each protected span may comprise more than one intermediate spans connected by a node of degree two. The failure of intermediate spans may be monitored using a span monitor.

According to another aspect, there is provided a method of designing a survivable network, comprising: establishing a mesh network having plural nodes connected by plural spans; identifying a set of protected spans; establishing pre-configured cycles that include plural protected spans and plural nodes of the mesh network to protect the set of protected spans such that each protected span is protected by a unique set of pre-configured cycles; and configuring each of the pre-configured cycles to transmit a signal in the event of a failure of one or more of the plural protected spans in the pre-configured cycles and to transfer network traffic from each protected span to at least one of the pre-configured cycles.

BRIEF DESCRIPTION OF THE DRAWINGS

Embodiments will now be described with reference to the figures, in which like reference characters denote like elements, by way of example, and in which.

DETAILED DESCRIPTION OF EMBODIMENTS

In an optically transparent network, network faults are not inherently identified within their span of origin. One approach to fault localization for networks in which this may be a problem involves providing a monitoring cycle (m-cycle) cover for the network graph. This approach is intended to be neutral with respect to the restoration technique used in a particular network. However, the inventors have discovered that it is possible to incorporate m-cycle concepts into a p-cycle network design without a significant increase in costs and invented a design method to incorporate this feature into an other-wise minimal-cost p-cycle survivable network design.

Figure 1:
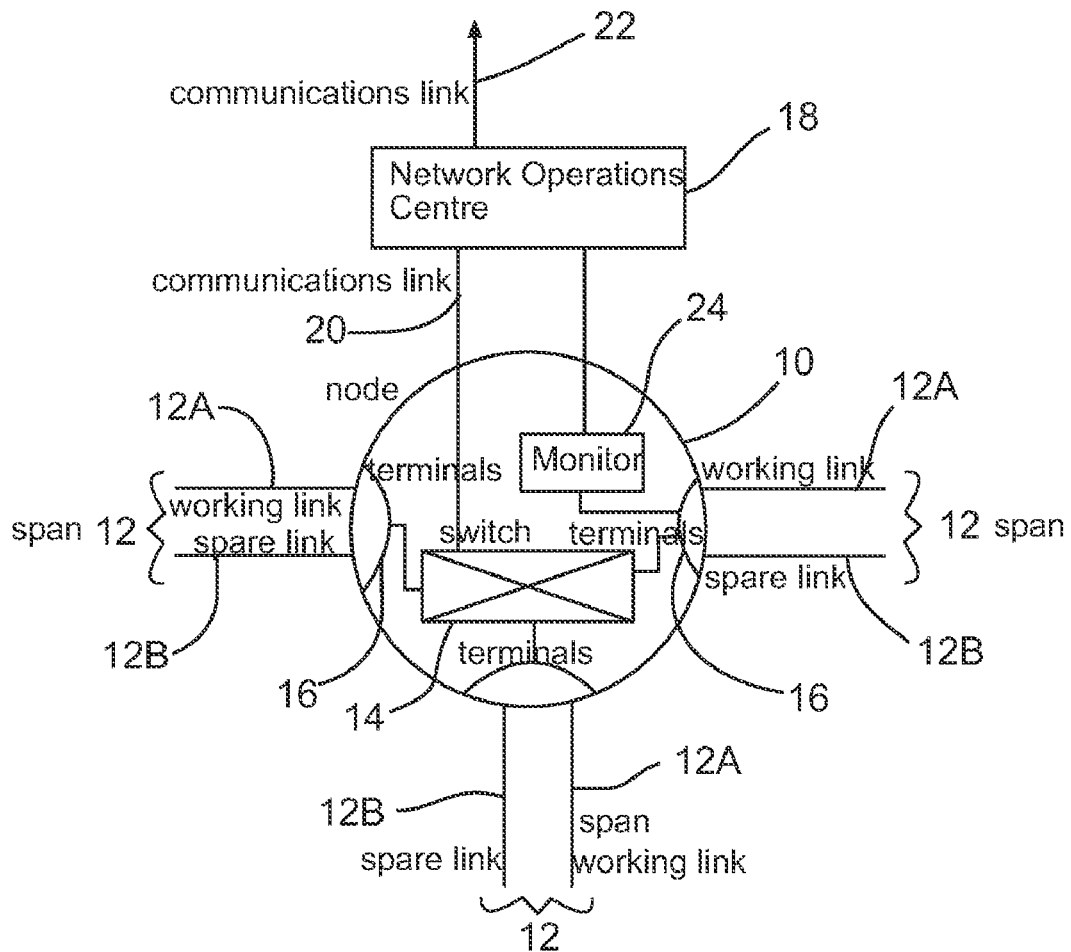
FIG. 1 is a schematic of a node configured for use in a p-cycle/m-cycle network.
Figure 2A:
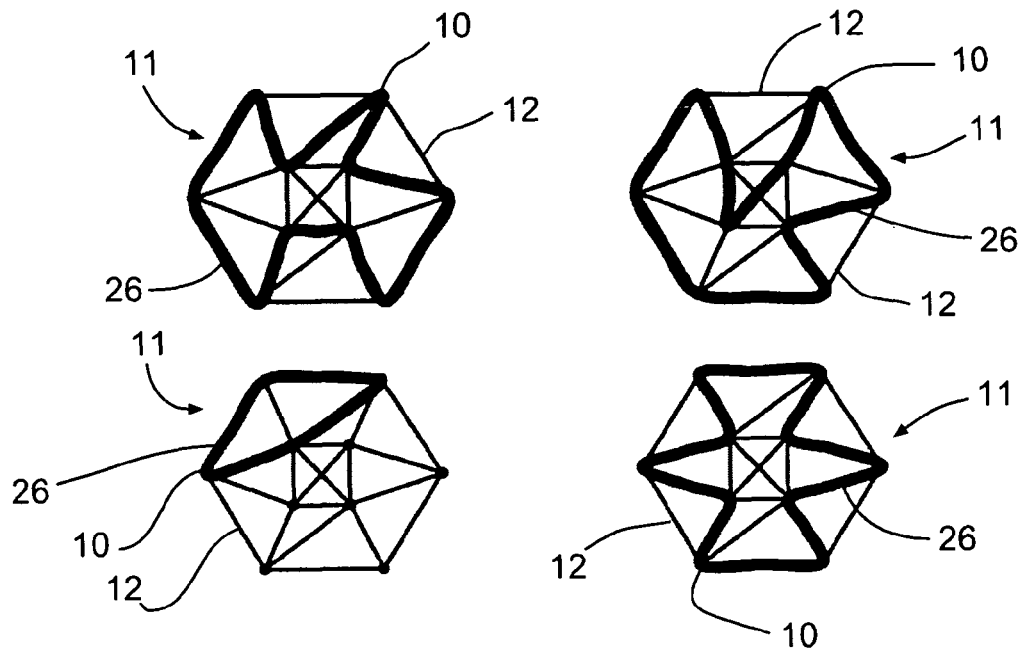
FIGS. 2A and 2B are diagrams of designs for the Smallnet network topology using both regular (FIG. 2A) and m-cycle-enhanced p-cycles (FIG. 2B)
Figure 2B:
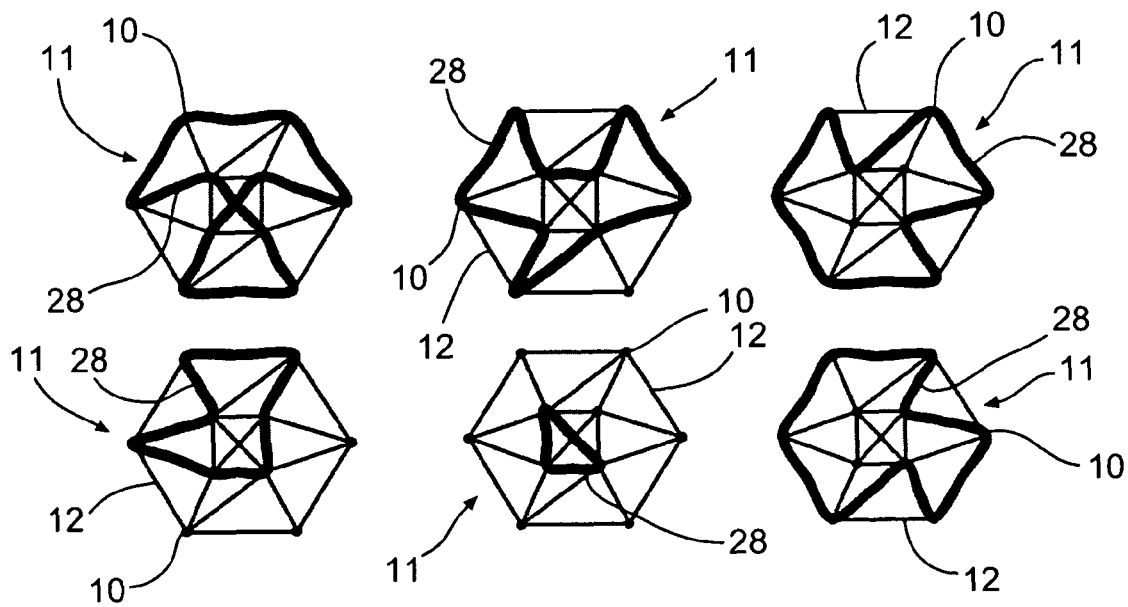

A network 11, see the examples in FIGS. 2A and 2B, may be formed of plural distinct nodes 10 interconnected by plural distinct spans 12. Each span 12 may be a telecommunications facility link having working links 12A and spare links 12B (FIG. 1). Each node 10 incorporates, and may be considered to consist essentially of, a conventional digital cross-connect switch 14 for making and breaking connections between links in adjacent spans 12 at the node 10. The links in spans 12 connect to the nodes 10 through fiber optic terminals 16 for electrical/optic conversion of the signals. A network operations center 18 controls the operation of the digital cross-connect switches via a control overlay of communications links 20, 22. All links shown, including the links forming the spans 12, are conventional communication links.

An m-cycle is a closed-loop path through a network, such as network 11, designed to monitor the nodes and spans within the closed path. The m-cycle is designed to allow monitoring and detection of a single or multiple span failures in the closed path defined by the m-cycle. A collection of m-cycles that cover every span and node within a network system is called an m-cycle cover. Each m-cycle is monitored to detect span failures within the m-cycle. An m-cycle cover may be selected so that every single span is covered by a unique set of m-cycles. In this way, a span failure can be uniquely identified by the unique set of m-cycles that report a span failure.

As described in Zeng et al. "A novel fault detection and localization scheme for mesh all-optical networks based on monitoring cycles" *Photon Netw. Commun.* (2006) 11:277-286 (which forms part of the provisional cited herein), an m-cycle cover is designed to include all nodes and spans to be protected in a network. As shown in FIG. 1, for each m-cycle, a cycle monitor 24 is provided at a node 10 with a loopback supervisory channel (not shown, but forms part of a span 12) in the cycle. This monitor 24 may take different forms, such as an optical power meter, an optical spectrum analyzer, or transceiver to detect such parameters as optical power, channel wavelength, optical signal-to-noise ratio, and bit error rate. The monitor 24 is preferably assigned to a node 10 with low management expense to reduce cost. Each monitor 24 monitors the associated cycle continuously. In the event of a failure, the failure will trigger an alarm in the m-cycles assigned to that span, but not others.

These alarms are transmitted to a central monitor, such as the network operations center 18. The alarms that are triggered and the alarms that are not may then be incorporated into an alarm code, which preferably localize the fault to a single span as if the span is identified by a unique subset of m-cycles, but may also localize the fault to a set of possible spans otherwise. If a single span is not identified, other techniques may then be used to attempt to identify the failed span among the subset. Reasons for not having one span per alarm code may include cost considerations, or network design, such as a path with one or more intermediate nodes of degree two. To design an m-cycle cover, approaches such as a heuristic depth-first searching algorithm, a shortest path Eulerian matching algorithm and heuristic spanning-tree based m-cycle construction algorithm have been suggested, although other algorithms may also be used. Factors that may be considered include localization degree, wavelength overhead, and cost gain.

The use of p-cycles to protect a network has been previously described, for example, in U.S. Pat. Nos. 5,850,505 and 6,421,349, and in W. D. Grover, D. Stamatelakis, "Cycle-oriented distributed preconfiguration: Ring-like speed with mesh-like capacity for self-planning network restoration," *Proc. IEEE International Conference on Communications* (*ICC*) '98, Atlanta, Ga., USA, 7-11 Jun. 1998, pp. 537-543. p-Cycles are implemented by pre-configuring spare capacity in a mesh network using a cycle-oriented approach. In an existing mesh network, this is done by connecting previously unconnected spare spans. In the event of a failure, only two nodes of the network will have any real-time cross-connection workload for any given failure, which gives the advantage of speed in a ring protected network, while still maintaining the capacity efficiency of a mesh network. Unlike a ring protected network, the protection capacity is planned and distributed on the network separately from the working capacity, which allows a network planner to provision working demands as if in a point-to-point mesh network to make use of the most efficient paths through a network, and then forming p-cycles in the sparing layer to adapt for maximal protection of the working path layer. This characteristic also allows the p-cycles to be modified after they are initially implemented. One approach to implementing a p-cycle protection scheme involves using a linear integer program (IP). First, a set of possible cycles is defined. This may be done by identifying all simple distinct cycles, or by seeding the program with certain preferred cycles to begin with. The IP program then generates an optimal p-cycle plan by choosing the number of copies of each elemental cycle on the network graph, to be configured as a p-cycle. This may be done by either designing a p-cycle plan within an existing mesh network spare capacity plan by maximizing the p-cycle restorability with a given amount and placement of spare capacity, such as from an existing mesh restorable design. It may also be done by designing a fully restorable p-cycle spare-capacity plan while minimizing the total amount of spare capacity. Once established, restoration is achieved by switching to the cycles and substituting traffic at failure time.

An example of a p-cycle design that incorporates the m-cycle concept is shown in FIGS. 2A and 2B, with diagrams of designs for the Smallnet network topology using regular p-cycles 26 shown in FIG. 2A, and m-cycle enhanced p-cycles 28 in FIG. 2B. As can be seen in FIG. 2B, each span of the network is uniquely protected by a p-cycle. By configuring each p-cycle to act as an m-cycle and transmit a signal when a failure occurs, the failed span may be identified by the combination of cycles that transmit and those that do not.

Problem Formulation for the Design of P-M Cycle Networks

The fault localization by m-cycles cannot be 100% when chain subnetworks exist. For two spans to produce different m-cycle alarms, there must be at least one cycle that passes over one span, but not the other. But if a cycle passes through one span in a chain, it necessarily passes through the others. The work in [2] recognizes this and proposes supplementing m-cycle designs in such cases with individual span monitors for the failure of spans in these chains. Here, we accordingly consider design for full localization only in chain-free networks or we seek designs that achieve the same maximum localization as in [2]. In both cases it is understood that dedicated span monitors can be used for the remaining intra-chain localization problem.

An Integer Linear Programming (ILP) approach allows us to study the feasibility and/or extra cost associated with combining p-cycle and m-cycle functionalities in a single design. An advantage of using ILP to answer basic questions of networking science is the prospect of obtaining clear answers to the questions involved. Development of heuristics can always follow if the basic findings from ILP studies indicate sufficient benefit.

One phrasing of the m-cycle cover problem is that, for every pair of spans in the network, there must be at least one m-cycle that crosses one span but not the other. In addition, every span must be covered by at least one m-cycle. Based on this we obtain an integrated m-cycle/p-cycle design model by adding two constraints to the existing ILP model for p-cycle network design. The parameters, sets, and variables of the model are:

Sets:
s is the set of spans in the network.
P is the set of candidate p-cycles. (In our results this is the set of all simple cycles of the network graph).

Parameters:
$w_i$ is the number of working channels on span i that require protection.
$x_i^k \in \{0,1,2\}$ encodes the number of protection relationships provided to span i by a unit-sized copy of p-cycle k.
$\delta_j^k \in \{0,1\}$ is 1 if span j is on cycle k and 0 otherwise.
$C_j$ is the cost of a wavelength channel on span j.

Variables:
$s_j \geq 0$ is the number of spare channels assigned to span j.
$n^k \geq 0$ is the number of unit-capacity copies of p-cycle k placed in the design.

The objective function and constraints become:

$$\text{Minimize} \sum_{j \in S} C_j \cdot s_j \qquad (1)$$

$$w_i \leq \sum_{k \in P} x_i^k \cdot n_k \quad \forall\, i \in S \qquad (2)$$

$$s_j = \sum_{k \in P} \delta_j^k \cdot n_k \quad \forall\, j \in S \qquad (3)$$

$$\sum_{k \in P:\, \delta_i^k = 1 \,XOR\, \delta_j^k = 1} n^k \geq 1 \quad \forall\, [i,j] \in S^2, i \neq j \qquad (4)$$

$$\sum_{k \in P:\, \delta_j^k = 1} n^k \geq 1 \quad \forall\, j \in S \qquad (5)$$

The objective function is the total cost of capacity to form cycles. Constraints (2) and (3) are the restorability and spare capacity generating constraints from a standard model for optimal p-cycle network design (see [3]). Constraints (4) and (5) add the m-cycle cover requirement to the problem by asserting that no two spans have the same set of cover cycles and that every span is covered by at least one cycle.

Results And Discussion

Figure 3C:
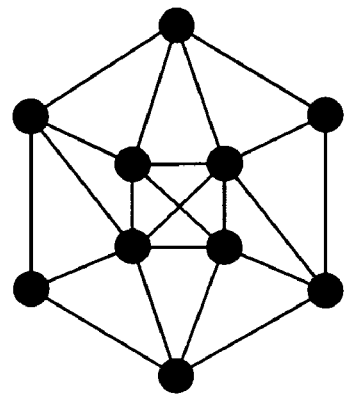
FIG. 3 shows test topologies: a) Bellcore, b) NSFNET, c) smallnet, d) Bellcore with chains removed, e) nsfnet with chains removed, and f) 15n30s1
Figure 3F:
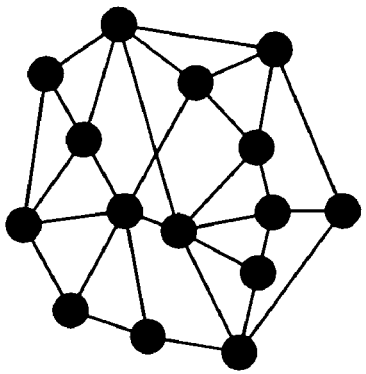
Figure 3B:
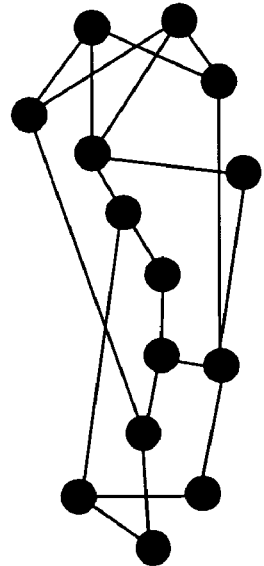
Figure 3E:
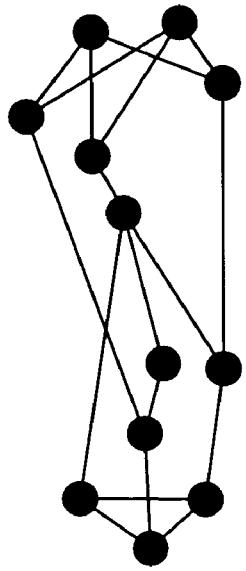
Figure 3A:
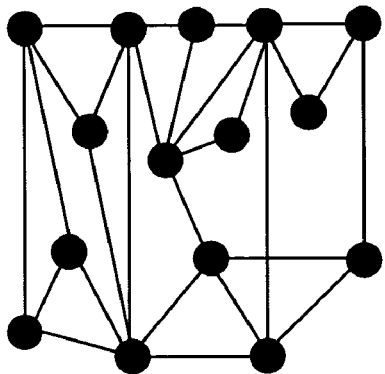
Figure 3D:
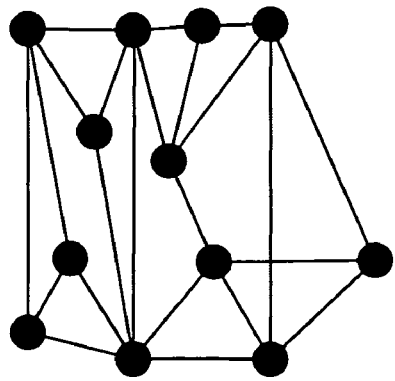

The combined design model was solved on three test networks also used in [2], illustrated in FIGS. 3(a) (b) and (c). The Bellcore and NSFNET networks contain chain subnetworks so full localization is not possible. Two approaches were taken to obtain comparative results in these cases. In one, chains were eliminated to obtain the "meta-mesh" topologies [5] with all nodes having degree 3 or greater. The modified topologies are shown in FIGS. 3,(d) and (e). Under the second approach, the design model was adapted to solve for maximum fault localization instead of total localization. The fault localization levels achieved are then the same as the best results for these networks in [2]. This approach allows assessment of any extra capacity needed to endow a p-cycle network with the same (either complete or partial) levels of localization achievable for optimal m-cycle design alone. In these tests, span costs are all set to 1 and the working capacity distribution is that arising from least-hop routing of one lightpath between every node pair.

An additional five tests for the effects of demand volume and pattern were performed on network 15n30s1 in FIG. 3(f). This is a topology of degree 4 with no chains. Span costs here are the Euclidean distances between the end-nodes of each span. The baseline test on this network uses uniform random demand in the interval [1 . . . 10] between each node pair, routed via shortest paths. In three tests the demand volumes are divided by 2, 4, and 6, and rounded down to the nearest integer value. A final test uses a unit demand between every node pair.

Results are summarized in Table 1. In one case, the solver had to be terminated before an optimal solution could be found. The value is marked with an asterisk, along with the gap from optimality. Results for 15n30s1 illustrate that increasing the demand volume decreases the incremental cost requirement. This makes sense because the total spare capacity for survivability is at least monotonically increasing with network demand for any scheme, whereas the m-cycle cover is purely topology dependent sort of "fixed cost" investment for the network as a whole. As the working capacity of a network increases it becomes increasingly easy to find a subset of cycles to realize the fault localization cover requirement within a restorable p-cycle design.

The main finding in Table 1 is that it seems quite feasible and economic to integrate m-cycle functionality into a p-cycle network design. The contrasting tendencies of m-cycles and p-cycles to prefer on-cycle versus straddling span relationships are not so difficult to reconcile after all. It is especially significant that this is the case even when using a unit demand pattern because this can be thought of as the full-communication demand pattern with the least total volume of working capacity against which to dilute or amortize the added cost of the m-cycle cover set.

CONCLUDING COMMENTS

We have shown that it is not difficult or necessarily costly to obtain m-cycle fault localization in p-cycle networks. The added cost of perturbing the p-cycle design to include an m-cycle cover may be zero or will at least be fixed in absolute cost for a given topology and hence becomes less significant to the total cost of a network as its demand increases. It is important to stress that what is achieved is not a p-cycle design for protection and a separate set of m-cycles for localization. Here, there are really only p-cycles. All capacity placed, and all cycles formed are usable for protecting working capacity, or for protecting future growth in working capacity. Thus, the added cost for m-cycle functionality is philosophically even less objectionable than in [2] where m-cycles are only used for monitoring and are not themselves part of the capacity usable for protection. Any p-cycle in a transparent network can be centrally monitored for loss-of-light or other alarms in a pre-failure state contributing as an m-cycle for the localization of various faults. Immediately following a fault, the same p-cycle can be activated as part of the survivability solution, as well as having been an instrument used to diagnose the problem. The main contribution is that we open up a new class of survivable networking strategies wherein span-protection via p-cycles is a new option for transparent networks, and we create the prospect of p-cycle networks which integrate their own fault detection and activation with the same structures that operate for protection itself.

Immaterial modifications may be made to the embodiments described here without departing from what is covered by the claims. In the claims, the word "comprising" is used in its inclusive sense and does not exclude other elements being present. The indefinite article "a" before a claim feature does not exclude more than one of the feature being present. Each one of the individual features described here may be used in one or more embodiments and is not, by virtue only of being described here, to be construed as essential to all embodiments as defined by the claims.

TABLE 1

Combined p-cycle/m-cycle experiment results

| Topology | Demand Volume and Pattern | Pure p-Cycle Design | Combined Design Cost | Percent Increase |
|---|---|---|---|---|
| 15n30s1 | Random 1-10 | 133792 | 134131 | 0.25% |
|  | Divided by 2 | 58117 | 58623 | 0.87% |
|  | Divided by 4 | 23045 | 23578 | 2.31% |
|  | Divided by 6 | 11547 | 12442* (3%) | <7.75% |
|  | Unit demand | 26749 | 27106 | 1.33% |
| Bellcore (with chains) | Unit demand | 151 | 156 | 3.31% |
| Bellcore (chains removed) | Unit demand | 79 | 83 | 5.06% |
| NSFNET (with chains) | Unit demand | 139 | 139 | 0% |
| NSFNET (chains removed) | Unit demand | 92 | 92 | 0% |
| smallnet | Unit demand | 38 | 45 | 18.42% |

REFERENCES

[1] H. Zeng, C. Huang, A. Vukovic, "A Novel Fault Detection and Localization Scheme for Mesh All-Optical Networks Based on Monitoring-Cycles", Photonic Network Communications, Vol. 11, No. 3, May 2006
[2] H. Zeng, Monitoring-Cycle Based Fault Detection and Localization in Mesh All-Optical Networks, Ph.D. Dissertation, Carleton University, Ottawa, Canada, Spring 2007
[3] W. D. Grover "p-Cycles" Chapter 10 in Mesh-based survivable networks: Options and strategies for optical, MPLS, SONET and ATM networking, Upper Saddle River, N.J.: Prentice Hall, 2004.
[4] W. Grover, D Stamatelakis, "Bridging the ring-mesh dichotomy with p-cycles", Proc. IEEE/VDE Design of Reliable Communication Networks (DRCN 2000), Munich, Germany, April 2000, pp. 92-104.
[5] W. D. Grover, J. Doucette, "Design of a meta-mesh of chain sub-networks: Enhancing the attractiveness of mesh-restorable WDM networking on low connectivity graphs," IEEE JSAC, vol. 20, no. 1., January 2002, pp. 47-61.

What is claimed is:

1. A telecommunications network comprising:
plural nodes connected by plural spans and arranged to form a mesh network, the mesh network having a set of protected spans, and a set of pre-configured cycles;
each pre-configured cycle of the set of pre-configured cycles including plural protected spans and plural nodes of the mesh network, the plural nodes of each respective pre-configured cycle being configured to transfer network traffic, in the event of a failure of a span protected by the respective pre-configured cycle, from the protected span to the respective pre-configured cycle, and at least one of the plural nodes of the respective pre-configured cycle being configured to transmit a signal in the event of a failure of one of the plural protected spans included in the respective pre-configured cycle; and
each protected span being included in each pre-configured cycle of a respective unique subset of the set of pre-configured cycles, such that the respective unique subset of pre-configured cycles identifies one protected span.

2. The telecommunications network of claim 1 in which at least a protected span of the set of protected spans comprises more than one intermediate span connected by a node of degree two, the node being a node of the plural nodes of the mesh network.

3. A method of producing a survivable network, comprising the steps of:
establishing a mesh network having plural nodes connected by plural spans;
identifying a set of protected spans;
establishing a set of pre-configured cycles that include plural protected spans and plural nodes of the mesh network to protect the set of protected spans such that each protected span is included in each pre-configured cycle of a unique subset of the set of pre-configured cycles; and
configuring each of the pre-configured cycles of the set of pre-configured cycles to transmit a signal in the event of a failure of one of the plural protected spans included in the respective pre-configured cycle and to transfer network traffic from each protected span to at least one of the pre-configured cycles of the set of pre-configured cycles in the event of a failure of the respective protected span.

4. The telecommunications network of claim 1 in which at least a protected span of the set of protected spans comprises more than one intermediate span connected by a node of degree two, the node being a node of the plural nodes of the mesh network.

* * * * *